United States Patent
Ando et al.

(10) Patent No.: US 11,372,932 B2
(45) Date of Patent: Jun. 28, 2022

(54) SENSOR METADATA GENERATION DEVICE, SENSOR METADATA GENERATION SYSTEM, SENSOR METADATA GENERATION METHOD, AND SENSOR METADATA GENERATION PROGRAM

(71) Applicant: OMRON Corporation, Kyoto (JP)

(72) Inventors: Tanichi Ando, Komaki (JP); Hiroyuki Miyaura, Tokyo (JP)

(73) Assignee: OMRON CORPORATION, Kyoto (JP)

( * ) Notice: Subject to any disclaimer, the term of this patent is extended or adjusted under 35 U.S.C. 154(b) by 417 days.

(21) Appl. No.: 16/481,095

(22) PCT Filed: Nov. 20, 2017

(86) PCT No.: PCT/JP2017/041601
§ 371 (c)(1),
(2) Date: Jul. 26, 2019

(87) PCT Pub. No.: WO2018/163520
PCT Pub. Date: Sep. 13, 2018

(65) Prior Publication Data
US 2020/0395131 A1     Dec. 17, 2020

(30) Foreign Application Priority Data

Mar. 7, 2017  (JP) .............................. JP2017-042728

(51) Int. Cl.
*G06F 16/907*   (2019.01)
*G16Y 40/10*    (2020.01)
(Continued)

(52) U.S. Cl.
CPC ............ *G06F 16/907* (2019.01); *G16Y 30/00* (2020.01); *G16Y 40/10* (2020.01); *G16Y 40/35* (2020.01); *H04L 67/12* (2013.01)

(58) Field of Classification Search
CPC .. G06F 16/907; G06F 11/302; G06F 11/3089; G06F 16/00; G16Y 30/00;
(Continued)

(56) References Cited

U.S. PATENT DOCUMENTS 8,862,715 B1   10/2014  Tom et al.
9,275,093 B2    3/2016  Pandey et al.
(Continued)

FOREIGN PATENT DOCUMENTS

JP   2001-117949 A   4/2001
JP      5445722 B1   3/2014
(Continued)

OTHER PUBLICATIONS

Soko Aoki et al., "A Sensor Actuator Network Architecture with Control Rules", 2009 Sixth International Conference on Networked Sensing Systems (INSS 2009) Jun. 17-19, 2009, Pittsburgh, PA, USA, IEEE—Piscataway, NJ, USA, Jun. 17, 2009 (Jun. 17, 2009), pp. 1-4, XP031625662, ISBN: 978-1-4244-6313-8; Relevance is indicated in the extended European search report dated Nov. 10, 2020.
(Continued)

*Primary Examiner* — Walter J Divito
(74) *Attorney, Agent, or Firm* — Metrolex IP Law Group, PLLC

(57) ABSTRACT

A sensor metadata generation device includes: a class storage unit configured to store a sensor container class that includes, as components, one or a plurality of sensor classes each including definitions of attributes of one or a plurality of sensors, and a sensor composition class including a
(Continued)

composition condition for compositing the one or a plurality of sensors as a single sensor entity, with a first interface that includes a declaration of a metadata acquisition method for acquiring metadata; an object generation unit configured, based on the sensor container class, to generate a sensor container object in which the configuration of the single sensor entity is defined; and a metadata acquisition unit configured to use the metadata acquisition method by the sensor container object to acquire metadata of the single sensor entity.

13 Claims, 7 Drawing Sheets

(51) Int. Cl.
*G16Y 30/00* (2020.01)
*G16Y 40/35* (2020.01)
*H04L 67/12* (2022.01)

(58) Field of Classification Search
CPC ........ G16Y 40/10; G16Y 40/35; H04L 67/12; H04W 4/38; H04W 4/70
See application file for complete search history.

(56) References Cited

U.S. PATENT DOCUMENTS

| 2008/0106406 | A1 | 5/2008 | Yoo et al. |
| 2012/0197852 | A1 | 8/2012 | Dutta et al. |
| 2012/0197856 | A1 | 8/2012 | Banka et al. |
| 2014/0372561 | A1 | 12/2014 | Hisano |
| 2015/0248275 | A1 | 9/2015 | Gallo et al. |
| 2017/0052678 | A1 | 2/2017 | Karasawa et al. |
| 2017/0053295 | A1 | 2/2017 | Tiell et al. |
| 2019/0258679 | A1* | 8/2019 | Kashiwagi .............. G06F 13/00 |

FOREIGN PATENT DOCUMENTS

| JP | 2016-24822 A | 2/2016 |
| WO | 2015/174120 A1 | 11/2015 |
| WO | 2017/035536 A1 | 3/2017 |

OTHER PUBLICATIONS

Extended European search report dated Nov. 10, 2020 in a counterpart European patent application.
Soko Aoki et al., "A Sensor Actuator Network Architecture with Control Rules", Paper Submission of Information Processing Society of Japan, IPSJ Transactions, 2009-1, [CD-ROM], Nov. 15, 2009, pp. 178 to 191, vol. 2, No. 2, Relevance is indicated in the (translated) ISR/WO dated Jan. 30, 2018.
International Search Report of PCT/JP2017/041601 dated Jan. 30, 2018.
Written Opinion of PCT/JP2017/041601 dated Jan. 30, 2018.
Office Action dated May 26, 2020 in a counterpart Japanese patent application.
Japanese Office Action (JPOA) dated Feb. 5, 2020 in a counterpart Japanese patent application.
Communication pursuant to Article 94(3) EPC dated Feb. 2, 2022 in a counterpart European patent application.

* cited by examiner

SENSOR METADATA GENERATION DEVICE, SENSOR METADATA GENERATION SYSTEM, SENSOR METADATA GENERATION METHOD, AND SENSOR METADATA GENERATION PROGRAM

TECHNICAL FIELD

The present invention relates to a sensor metadata generation device, a sensor metadata generation system, a sensor metadata generation method, and a sensor metadata generation program.

BACKGROUND ART

In recent years, a technology called IoT (Internet of Things) has been developed. IoT is a technology that creates new value by combining information relating to various things that exist in the world on a communications network. In order to generate value from IoT, it is necessary to read the state of things with sensors and distribute sensing data.

Patent Literature 1 relates to a mechanism for distributing sensing data, and in Patent Literature 1, there is disclosed a data flow control order generating apparatus that matches sensor-side metadata, which is information relating to a sensor that outputs sensing data, and application-side metadata, which is information relating to an application that provides a service using the sensing data, and transmits a data flow control order specifying the sensor and the application that have been matched.

CITATION LIST

Patent Literature

Patent Literature 1: JP 5445722B1

SUMMARY OF INVENTION

Technical Problem

As described in Patent Literature 1, matching of sensors and applications can be smoothly performed using metadata such as sensor-side metadata. Here, the metadata may be individually generated by the user.

However, sensing data is expected to increase in the future, and if users individually generate metadata, it is expected that not only will the amount of work become quite large, but metadata of different formats will be generated for a plurality of sensors that output equivalent sensing data, and therefore the processing load and the communications load when matching sensors and applications will increase.

Therefore, an object of the present invention is to provide a sensor metadata generation device, a sensor metadata generation system, a sensor metadata generation method, and a sensor metadata generation program capable of generating metadata of the same format for sensors that output equivalent sensing data.

Solution to Problem

A sensor metadata generation device according to one aspect of the present invention includes: a class storage unit configured to store a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class; an object generation unit configured, based on the sensor container class, to generate a sensor container object in which the configuration of the single sensor entity is defined; and a metadata acquisition unit configured to use the metadata acquisition method by the sensor container object to acquire metadata of the single sensor entity.

According to this aspect, the first interface is mounted in the sensor container class, so existence of the metadata acquisition method is secured, and it is possible to unify metadata acquisition rules. Therefore, it is possible to generate metadata of the same format for a group of sensors that output equivalent sensing data. Also, uniform metadata is generated, so it is possible to suppress the processing load and the communications load when matching sensor groups and applications.

In the above aspect, a configuration may be adopted in which the class storage unit stores the sensor class in which the first interface is mounted, the object generation unit, based on the sensor class, generates a sensor object in which the configuration of a sensor is defined, and the metadata acquisition unit uses the metadata acquisition method by the sensor object to acquire metadata of the sensor.

According to this aspect, the first interface is mounted in the sensor class, so existence of the metadata acquisition method is secured, and it is possible to unify metadata acquisition rules. Therefore, it is possible to generate metadata of the same format for sensors that output equivalent sensing data. Also, uniform metadata is generated, so it is possible to suppress the processing load and the communications load when matching sensors and applications.

In the above aspect, a configuration may be adopted in which, in the sensor container class, a second interface that includes a declaration of a sensing data acquisition method for acquiring sensing data to be output from the single sensor entity is mounted, and the sensor metadata generation device further includes a sensing data acquisition unit configured to use the sensing data acquisition method by the sensor container object to acquire the sensing data.

According to this aspect, the second interface is mounted in the sensor container class, so existence of the sensing data acquisition method is secured, and it is possible to unify sensing data acquisition rules. Therefore, it is possible to accumulate sensing data by uniform processing, and it is possible to suppress the processing load and the communications load that accompany a search for sensing data.

In the above aspect, a configuration may be adopted in which the sensor metadata generation device further includes: a receiving unit configured to receive selection of one or a plurality of sensors and a composition condition for compositing the one or a plurality of sensors as a single sensor entity; and a class generation unit configured to generate a sensor container class that includes, as components, one or a plurality of sensor classes each including definitions of attributes of one or a plurality of sensors for which selection was received by the receiving unit, and a sensor composition class including a composition condition received by the receiving unit, with a first interface being mounted in the sensor container class; and the class storage unit stores the sensor container class generated by the class generation unit.

According to this aspect, one or a plurality of sensors are combined as a single sensor entity, and by generating a new sensor container class, it is possible to prescribe the basic configuration of the single sensor entity. Therefore, the basic configuration of sensors does not change for each sensing data provider, and metadata can be acquired with fixed rules by the metadata acquisition method. As a result, it is possible to suppress the processing load and the communications load when generating metadata.

A sensor metadata generation system according to one aspect of the present invention includes: the sensor metadata generation device according to the above aspect; and one or a plurality of sensors configured to be connected to the sensor metadata generation device through a communications network; in which the sensor metadata generation device generates metadata of the one or a plurality of sensors.

According to this aspect, with the sensor metadata generation device that is capable of generating metadata of the same format for sensors that output equivalent sensing data, it is possible to generate metadata of the same format for a single sensor entity. Also, uniform metadata is generated, so it is possible to suppress the processing load and the communications load when matching a single sensor entity and an application.

A metadata generation method according to one aspect of the present invention includes: a step of, based on a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class, generating a sensor container object in which the configuration of the single sensor entity is defined; and a step of using the metadata acquisition method by the sensor container object to acquire metadata of the single sensor entity.

According to this aspect, the first interface is mounted in the sensor container class, so existence of the metadata acquisition method is secured, and it is possible to unify metadata acquisition rules. Therefore, it is possible to generate metadata of the same format for a single sensor entity that outputs equivalent sensing data. Also, uniform metadata is generated, so it is possible to suppress the processing load and the communications load when matching a single sensor entity and an application.

A metadata generation program according to one aspect of the present invention causes a computer to function as: a class storage unit configured to store a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class; an object generation unit configured, based on the sensor container class, to generate a sensor container object in which the configuration of the single sensor entity is defined; and a metadata acquisition unit configured to use the metadata acquisition method by the sensor container object to acquire metadata of the single sensor entity.

According to this aspect, the first interface is mounted in the sensor container class, so existence of the metadata acquisition method is secured, and it is possible to unify metadata acquisition rules. Therefore, it is possible to generate metadata of the same format for a single sensor entity that outputs equivalent sensing data. Also, uniform metadata is generated, so it is possible to suppress the processing load and the communications load when matching a single sensor entity and an application.

Advantageous Effects of Invention

According to the present invention, there are provided a sensor metadata generation device, a sensor metadata generation system, a sensor metadata generation method, and a sensor metadata generation program capable of generating metadata of the same format for sensors that output equivalent sensing data.

DESCRIPTION OF EMBODIMENTS

Embodiments of the present invention will be described with reference to the accompanying drawings. Note that, in each drawing, the same reference signs are assigned to items that have the same or a similar configuration.

Figure 1:
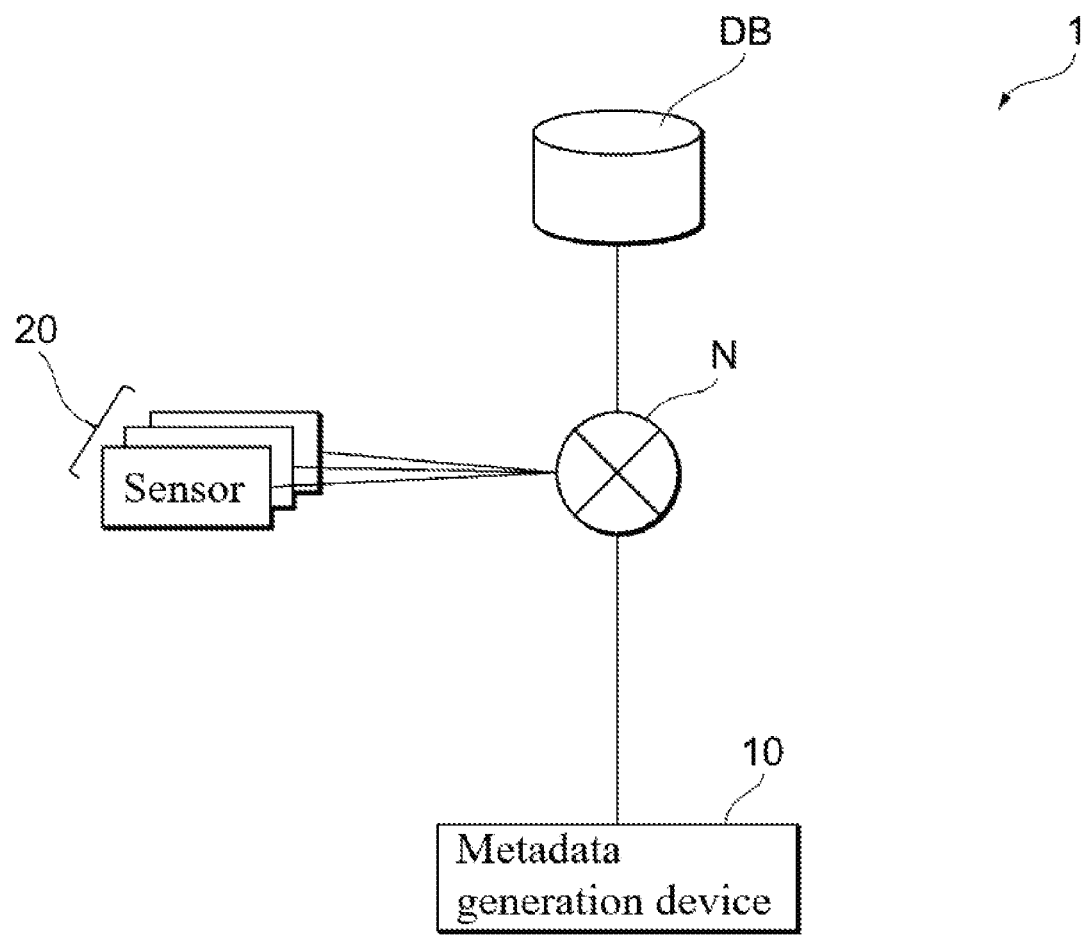
FIG. 1 shows a network configuration of a sensor metadata generation system according to an embodiment of the present invention.

FIG. 1 shows a network configuration of a sensor metadata generation system 1 according to an embodiment of the present invention. The sensor metadata generation system 1 according to the present embodiment includes a metadata generation device 10 that generates sensor metadata, one or a plurality of sensors 20, and a sensing data storage unit DB. Note that the sensor metadata generation system 1 may include configurations other than these. The metadata generation device 10 is connected to a communications network N, and is connected to one or a plurality of the sensors 20 and the sensing data storage unit DB through the communications network N. The communications network N may be either a wired communications network or a wireless communications network configured by a wired or wireless line, and may be the Internet or a LAN (Local Area Network). Note that in the present specification, a sensor metadata generation device is referred to simply as a metadata generation device.

The sensor 20 may be either a physical quantity sensor that detects a physical quantity or an information sensor that detects information. The physical quantity sensor may include, for example, a camera that detects light and outputs image data or movie data, or a microphone that detects sound and outputs audio data, or may include a sensor that detects another arbitrary physical quantity and outputs an electrical signal. The information sensor may include, for example, a sensor that detects a specific pattern from statistical data, or may include a sensor that detects other arbitrary information.

The sensing data storage unit DB stores sensing data output by the sensor 20. In FIG. 1, the sensing data storage unit DB is shown as a single storage unit, but the sensing data storage unit DB may be configured using one or a plurality of file servers.

Figure 2:
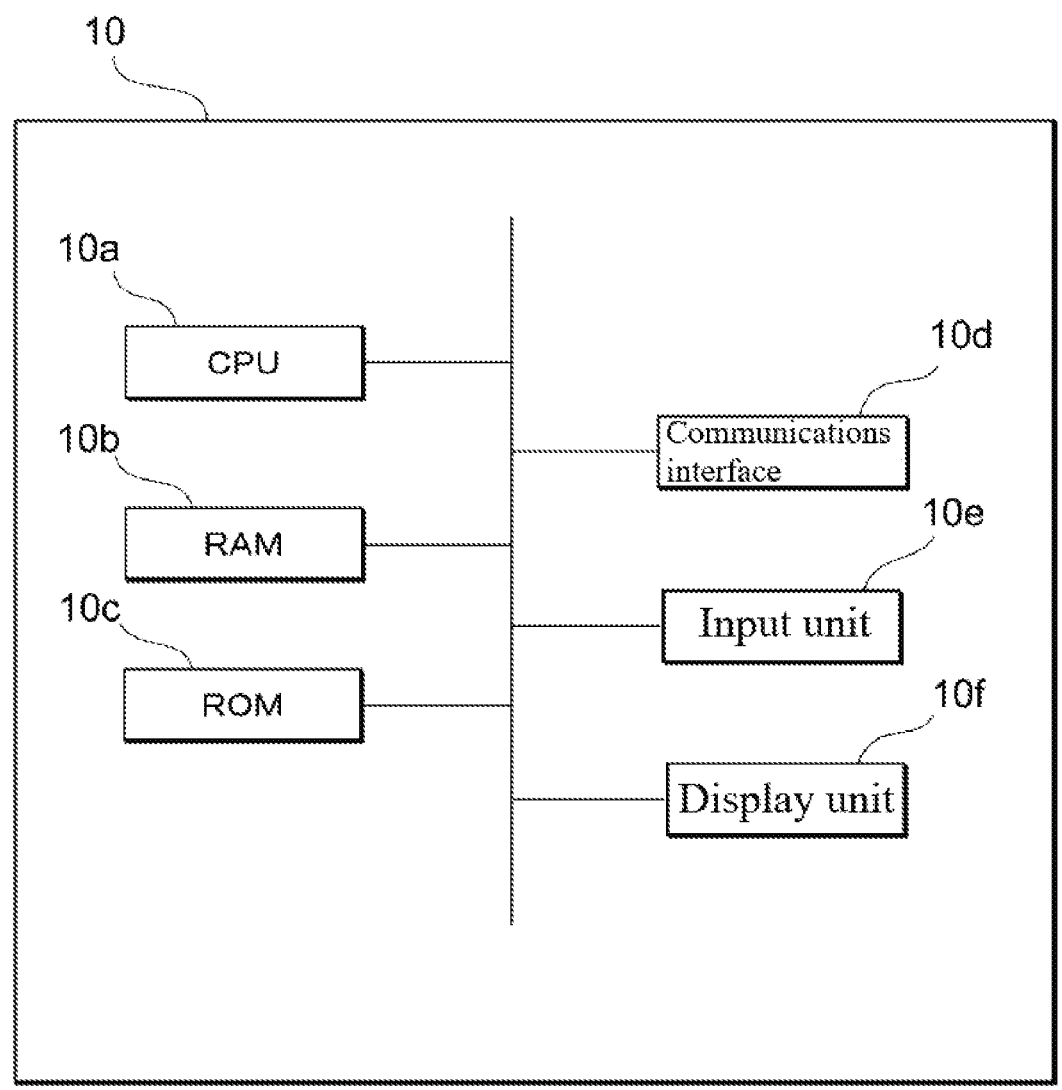
FIG. 2 shows a physical configuration of a metadata generation device according to an embodiment of the present invention.

FIG. 2 shows the physical configuration of the metadata generation device 10 according to an embodiment of the present invention. The metadata generation device 10 includes a CPU (Central Processing Unit) 10a corresponding to a hardware processor, a RAM (Random Access Memory) 10b corresponding to a memory, a ROM (Read Only Memory) 10c corresponding to a memory, a communications interface 10d, an input unit 10e, and a display unit 10f. These configurations are connected to each other so as to be able to transmit and receive data through a bus.

The CPU 10a executes a program stored in the RAM 10b or the ROM 10c, and calculates and processes data. The CPU 10a is a computing device that executes an application for generating metadata. The CPU 10a receives various input data from the input unit 10e and the communications interface 10d, and displays calculation results of the input data on the display unit 10f, or stores these calculation results in the RAM 10b or the ROM 10c.

The RAM 10b is a storage unit capable of rewriting data, and is configured with, for example, a semiconductor storage element. The RAM 10b stores programs and data of applications or the like executed by the CPU 10a.

The ROM 10c is a storage unit that can only read data, and is configured with, for example, a semiconductor storage element. The ROM 10c, stores, for example, programs and data of firmware or the like.

The communications interface 10d is a hardware interface that connects the metadata generation device 10 to the communications network N.

The input unit 10e receives input of data from a user, and is configured with, for example, a keyboard, a mouse, or a touch panel.

The display unit 10f visually displays the results of calculation by the CPU 10a, and is configured using, for example, an LCD (Liquid Crystal Display).

The metadata generation device 10 may be configured by executing a metadata generation program according to the present embodiment with the CPU 10a of a common personal computer. The metadata generation program may be provided stored in a computer-readable storage medium such as the RAM 10b or the ROM 10c, or may be provided through the communications network N connected through the communications interface 10d.

Note that these physical configurations are given as examples, and are not necessarily independent configurations. For example, the metadata generation device 10 may include an LSI (Large-Scale Integration) in which the CPU 10a, the RAM 10b, and the ROM 10c are integrated.

Figure 3:
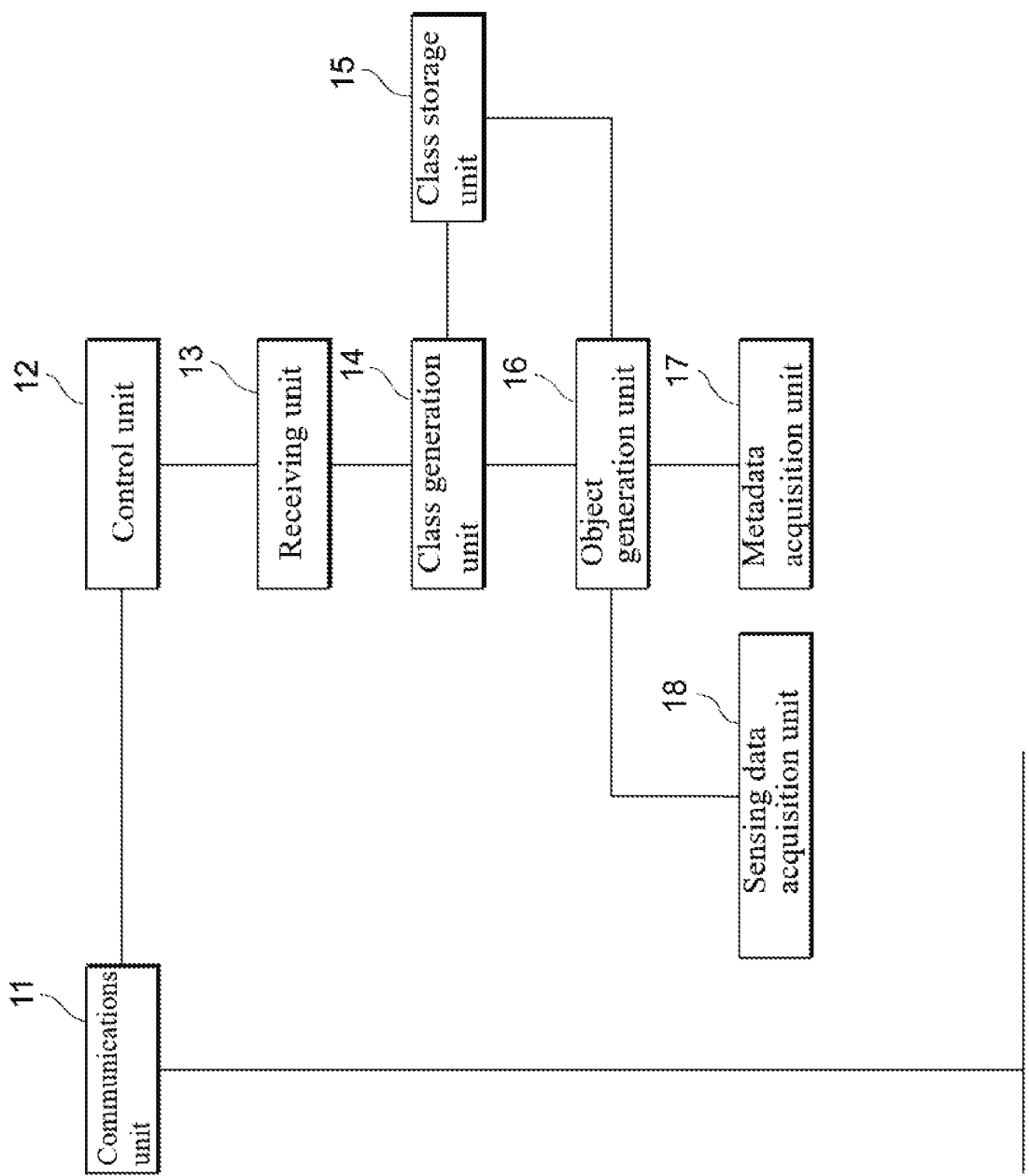
FIG. 3 shows a functional block diagram of the metadata generation device according to an embodiment of the present invention.

FIG. 3 shows a functional block diagram of the metadata generation device 10 according to an embodiment of the present invention. The metadata generation device 10 includes a communications unit 11, a control unit 12, a receiving unit 13, a class generation unit 14, a class storage unit 15, an object generation unit 16, a metadata acquisition unit 17, and a sensing data acquisition unit 18. Note that the functional blocks shown in FIG. 3 represent functions to be exhibited using the physical configurations provided in the metadata generation device 10, and do not necessarily correspond one-to-one with physical configurations.

The communications unit 11 is connected to an external communications network N, and transmits and receives data. The control unit 12 controls processing executed by the metadata generation device 10.

The receiving unit 13 receives selection of one or a plurality of sensors and a composition condition for compositing the one or a plurality of sensors as a single sensor entity. The receiving unit 13 receives selection of one or a plurality of sensors from a user, or receives a composition condition, in a sensor construction screen described later with reference to the drawings. Here, the single sensor entity includes one or a plurality of sensors whose selection has been received by the receiving unit 13, and functions as a group of sensors according to a composition condition.

The class generation unit 14 generates a sensor container class that includes, as components, one or a plurality of sensor classes each including definitions of attributes of one or a plurality of sensors for which selection was received by the receiving unit 13, and a sensor composition class including a composition condition received by the receiving unit 13, with a first interface that includes a declaration of a metadata acquisition method for acquiring metadata being mounted in the sensor container class. Here, a sensor attribute is data that characterizes a sensor, and for example, may include a type of the information or physical quantity detected by the sensor, a data format of sensing data output by the sensor, a regulation or standard relating to the sensor, a data output format such as REST type or STREAM type, a sensor communications speed, data describing the sensor, or data facilitating a search for the sensor. Also, the sensor class, the composition class, and the sensor container class may be defined using an object-oriented programming language, and respectively prescribe types of sensor objects, composition objects, and sensor container objects. Also, the first interface is an interface mounted in a class, and defines a function shared by a plurality of classes. Note that the first interface defines how to call a metadata acquisition method for acquiring metadata, and does not define the content of the metadata acquisition method. The class generation unit 14 can also generate a sensor class that includes a definition of the attributes of one sensor for which selection was received by the receiving unit 13, with a first interface being mounted in the generated sensor class.

The composition class may include an operation class for performing operations such as addition or subtraction on sensing data to be output from one or a plurality of sensors, and may include a trigger class that prescribes a condition in which a plurality of sensors output sensing data as a single sensor entity. Also, the sensor container class may include a timer class that measures time.

The class storage unit 15 stores the sensor container class generated by the class generation unit 14. That is, the class storage unit 15 stores a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class. Also, the class storage unit 15 stores a sensor class in which the first interface is mounted. In the sensor container class, a second interface that includes a declaration of a sensing data acquisition method for acquiring sensing data to be output from the single sensor entity is mounted, and in a sensor class, a second interface that includes a declaration of a sensing data acquisition method for acquiring sensing data to be output from a sensor is mounted.

The object generation unit 16 generates a sensor container object in which the configuration of a single sensor entity is defined based on the sensor container class. Here, the sensor container object is an object of a type prescribed by the sensor container class, and may include specific information relating to attributes of one or a plurality of sensors, specific information relating to a composition condition for compositing one or a plurality of sensors as a single sensor entity, specific information relating to a metadata acquisition method for acquiring metadata, and specific information relating to a sensing data acquisition method for acquiring sensing data. Also, the object generation unit 16 generates a sensor object in which the configuration of the sensor is defined based on the sensor class. A sensor object is an object of a type prescribed by a sensor class, and may include specific information relating to attributes of a sensor, specific information relating to a metadata acquisition method for acquiring metadata, and specific information relating to a sensing data acquisition method for acquiring sensing data.

The metadata acquisition unit 17 uses the metadata acquisition method by a sensor container object to acquire metadata of a single sensor entity. The sensor container object is an object of a type prescribed by the sensor container class, and the sensor container class includes a metadata acquisition method, because the first interface is mounted when the sensor container class is generated by the class generation unit 14. Also, by mounting the first interface, it is possible to provide uniform metadata acquisition rules for all of the sensor container objects. Also, the metadata acquisition unit 17 uses the metadata acquisition method by a sensor object to acquire sensor metadata. Also regarding the sensor class that prescribes the type of sensor object, the first interface is mounted when the sensor class is generated by the class generation unit 14, so it is possible to provide uniform metadata acquisition rules for all of the sensor objects.

The sensing data acquisition unit 18 uses the sensing data acquisition method by a sensor container object to acquire sensing data. The sensor container class and the sensor class include a sensing data acquisition method, because a second interface that includes a declaration of a sensing data acquisition method for acquiring sensing data to be output from a single sensor entity is mounted. By mounting the second interface, it is possible to provide uniform sensing data acquisition rules for all of the sensor container objects and all of the sensor objects.

Figure 4:
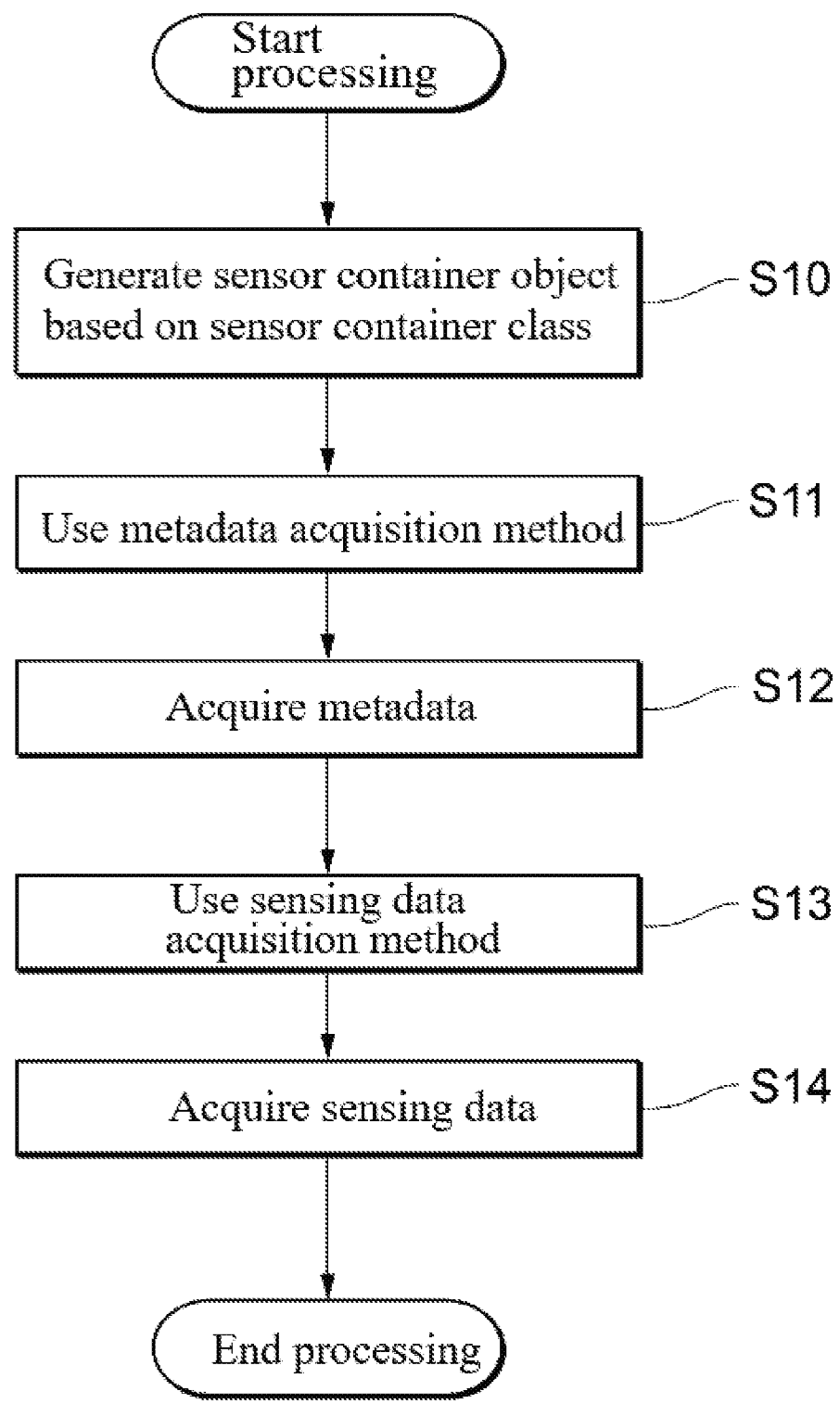
FIG. 4 is a flowchart showing first processing executed by the metadata generation device according to an embodiment of the present invention.

FIG. 4 is a flowchart showing first processing executed by the metadata generation device 10 according to an embodiment of the present invention. The metadata generation device 10 generates a sensor container object with the object generation unit 16 based on a sensor container class stored in the class storage unit 15 (S10). The metadata acquisition unit 17, using the metadata acquisition method by the sensor container object (S11), acquires metadata relating to one or a plurality of sensors prescribed by the sensor container object and metadata relating to a composition condition for compositing one or a plurality of sensors as a single sensor entity (S12).

According to the metadata generation device 10 according to the present embodiment, the first interface is mounted in the sensor container class, so existence of the metadata acquisition method is secured, and it is possible to unify metadata acquisition rules. Therefore, it is possible to generate metadata of the same format for a single sensor entity that outputs equivalent sensing data. Also, uniform metadata is generated, so it is possible to suppress the processing load and the communications load when matching a single sensor entity and an application.

Also, according to the sensor metadata generation system 1 according to the present embodiment, it is possible to generate metadata of the same format for a single sensor entity with the metadata generation device 10, which is capable of generating metadata of the same format for a single sensor entity that outputs equivalent sensing data. Also, uniform metadata is generated, so it is possible to suppress the processing load and the communications load when matching a single sensor entity and an application.

The sensing data acquisition unit 18 of the metadata generation device 10, using the sensing data acquisition method by the sensor container object (S13), acquires sensing data to be output from the single sensor entity prescribed by the sensor container object (S14).

According to the metadata generation device 10 according to the present embodiment, the second interface is mounted in the sensor container class, so existence of the sensing data acquisition method is secured, and it is possible to unify sensing data acquisition rules. Therefore, it is possible to accumulate sensing data by uniform processing, and it is possible to suppress the processing load and the communications load that accompany a search for sensing data.

Figure 5:
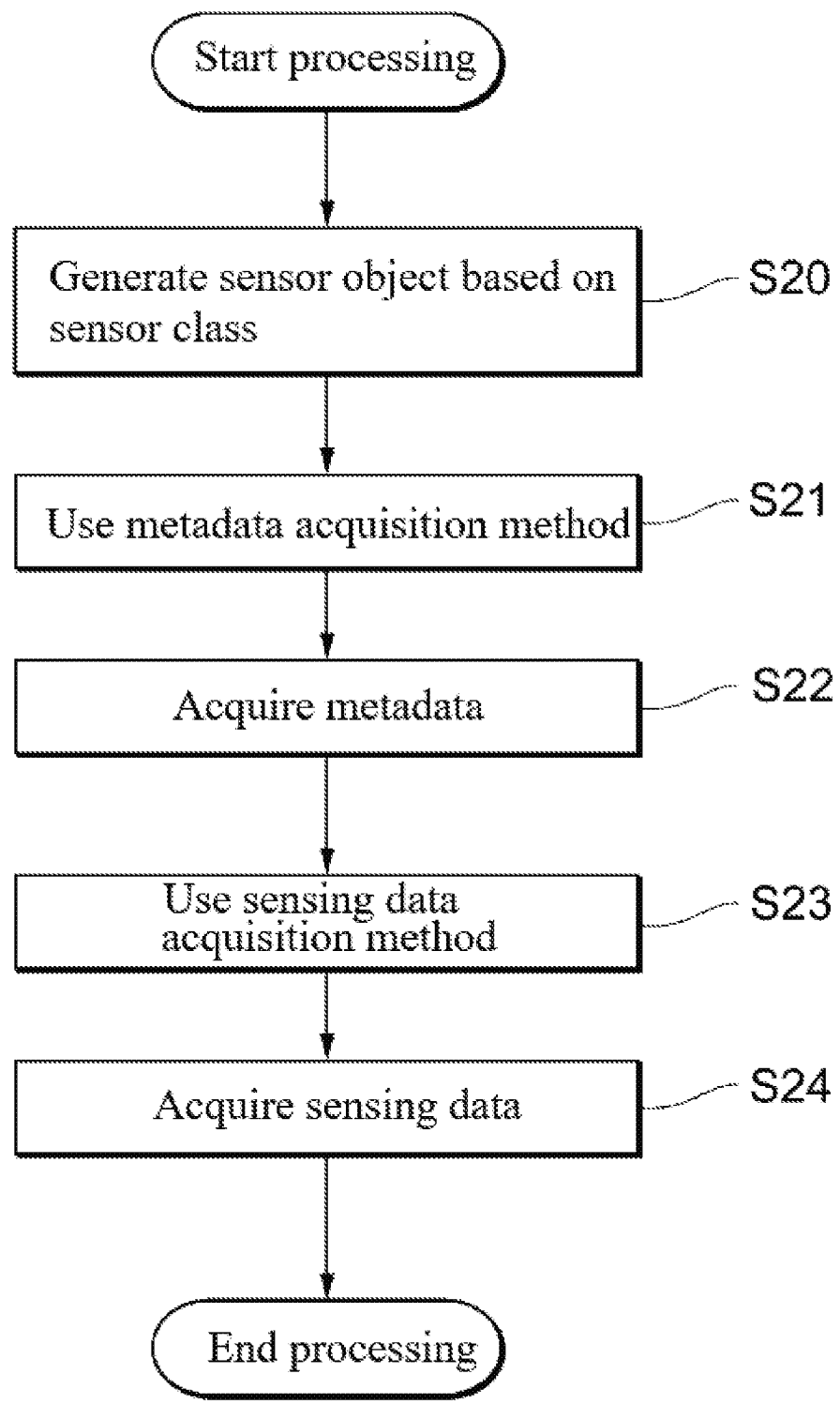
FIG. 5 is a flowchart showing second processing executed by the metadata generation device according to an embodiment of the present invention.

FIG. 5 is a flowchart showing second processing executed by the metadata generation device 10 according to an embodiment of the present invention. The metadata generation device 10 generates a sensor object with the object generation unit 16 based on a sensor class stored in the class storage unit 15 (S20). The metadata acquisition unit 17, using the metadata acquisition method by the sensor object (S21), acquires metadata relating to a sensor prescribed by the sensor object (S22).

The first interface is mounted in the sensor class, so existence of the metadata acquisition method is secured, and it is possible to unify metadata acquisition rules. Therefore, it is possible to generate metadata of the same format for sensors that output equivalent sensing data. Also, uniform metadata is generated, so it is possible to suppress the processing load and the communications load when matching sensors and applications.

The sensing data acquisition unit 18 of the metadata generation device 10, using the sensing data acquisition method by the sensor object (S23), acquires sensing data to be output from a sensor prescribed by the sensor object (S24).

According to the metadata generation device 10 according to the present embodiment, the second interface is mounted in the sensor class, so existence of the sensing data acquisition method is secured, and it is possible to unify sensing data acquisition rules. Therefore, it is possible to accumulate sensing data by uniform processing, and it is possible to suppress the processing load and the communications load that accompany a search for sensing data.

Figure 6:
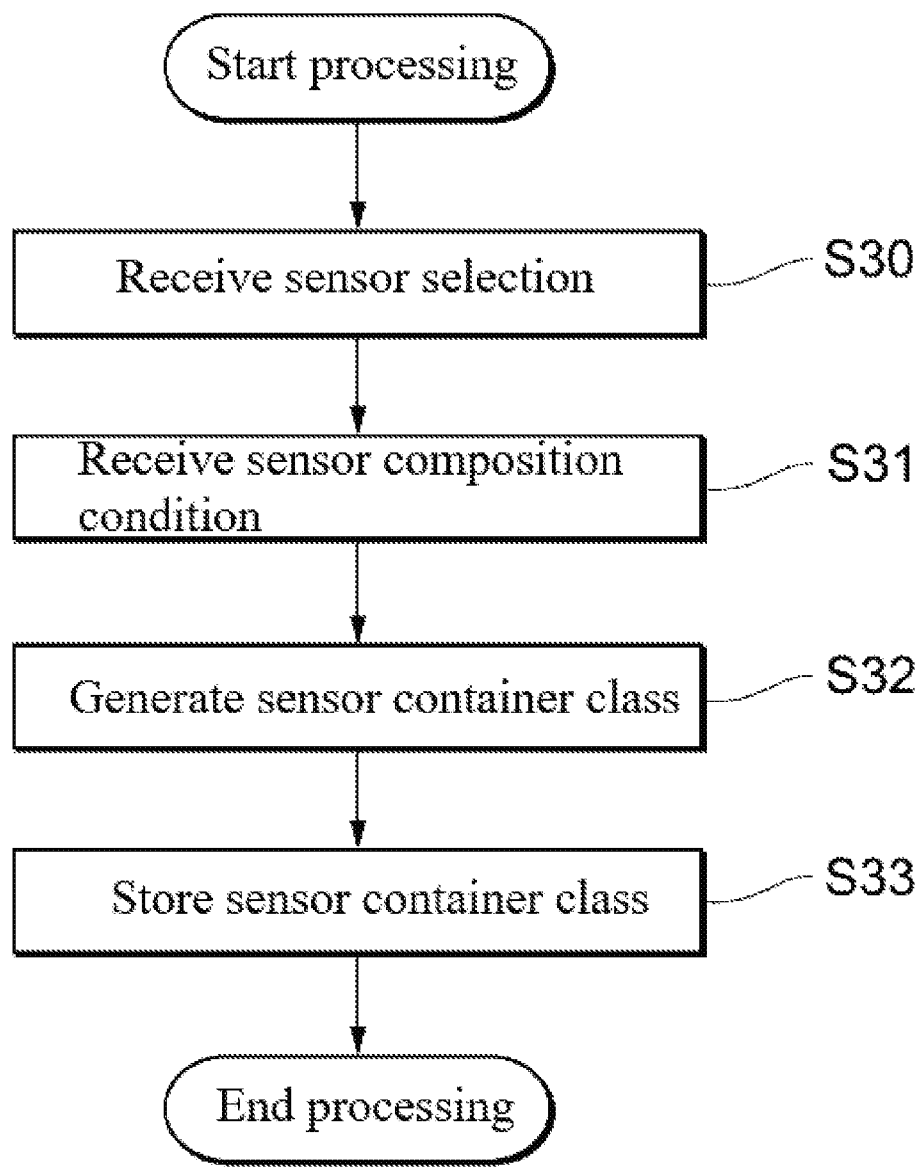
FIG. 6 is a flowchart showing processing relating to sensor container class generation executed by the metadata generation device according to an embodiment of the present invention.

FIG. 6 is a flowchart showing processing relating to sensor container class generation executed by the metadata generation device 10 according to an embodiment of the present invention. The receiving unit 13 receives selection of one or a plurality of sensors (S30). Also, the receiving unit 13 receives a composition condition for compositing the one or a plurality of sensors for which selection was received as a single sensor entity (S31).

The class generation unit 14 generates a sensor container class that includes, as components, one or a plurality of sensor classes each including definitions of attributes of one or a plurality of sensors for which selection was received by the receiving unit 13, and a sensor composition class including a composition condition received by the receiving unit 13, with a first interface being mounted in the sensor container class (S32). The generated sensor container class is stored in the class storage unit 15 (S33).

According to the metadata generation device 10 according to the present embodiment, one or a plurality of sensors are combined as a single sensor entity, and by generating a new sensor container class, it is possible to prescribe the basic configuration of the single sensor entity. Therefore, the basic configuration of sensors does not change for each sensing data provider, and metadata can be acquired with fixed rules by the metadata acquisition method. As a result, it is possible to suppress the processing load and the communications load when generating metadata.

Figure 7:
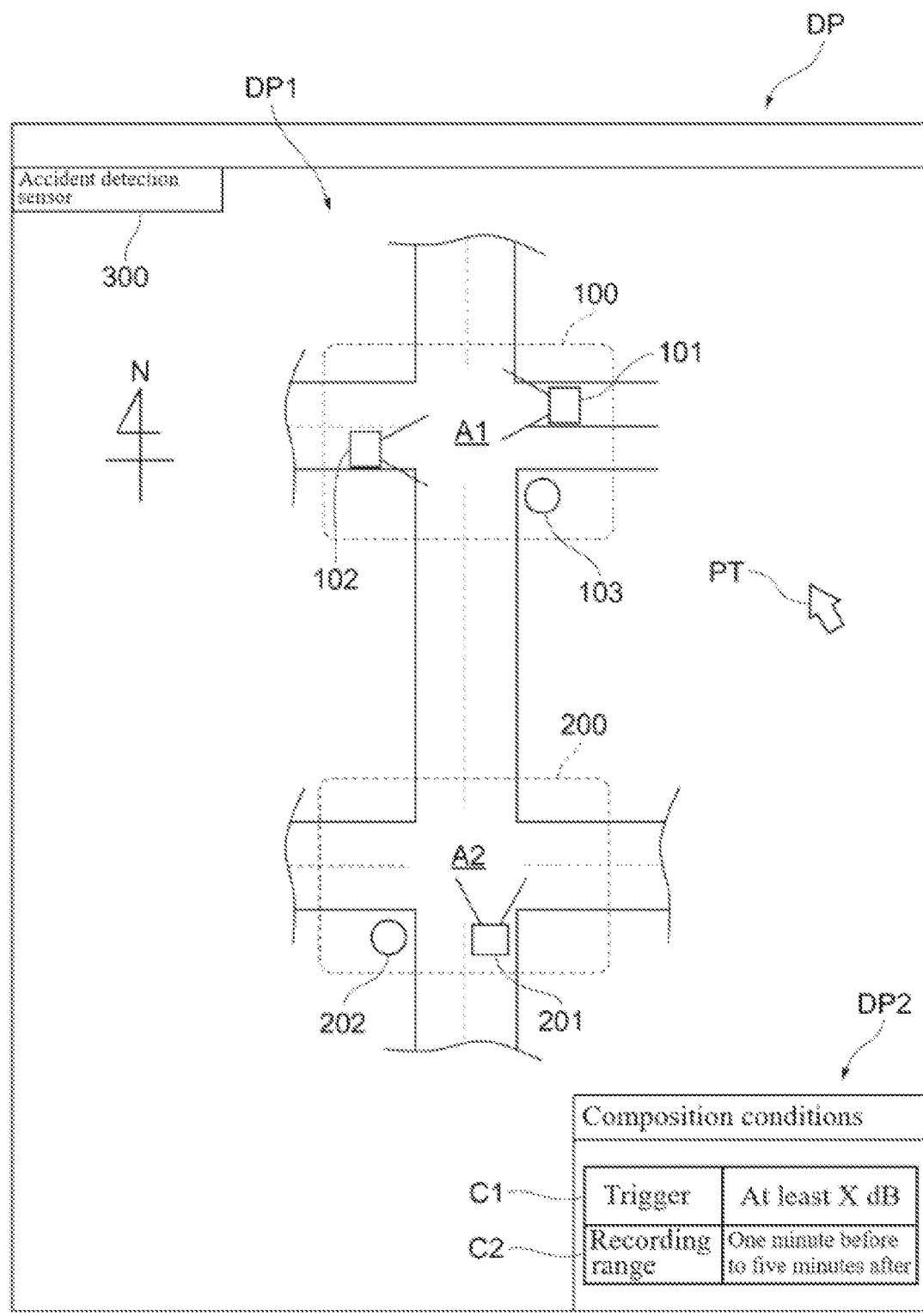
FIG. 7 shows an example of a sensor construction screen displayed by the metadata generation device according to an embodiment of the present invention.

FIG. 7 shows an example of a sensor construction screen DP displayed by the metadata generation device 10 according to an embodiment of the present invention. The sensor construction screen DP is a screen displayed by a sensor construction tool for receiving selection of one or a plurality of sensors and composition conditions for compositing the one or a plurality of sensors as a single sensor entity, constructing the single sensor entity, and publishing the constructed single sensor entity. Using various tools displayed in the sensor construction screen DP, a sensing data provider can construct a single sensor entity without performing programming, and can publish the constructed single sensor entity.

The sensor construction screen DP of this example includes a sensor arrangement screen DP1 and a composition condition setting screen DP2. Also, the sensor construction screen DP includes a pointer PT of a pointing device. Note that the sensor construction screen DP may include configurations other than these. A user who uses the sensor construction tool operates a sensor icon displayed in the sensor arrangement screen DP1 with the pointer PT to select a sensor or change the arrangement or direction of a sensor. Also, the user uses the composition condition setting screen DP2 to set the composition conditions of the sensors arranged in the sensor arrangement screen DP1.

FIG. 7 shows an example of the sensor construction screen DP in a case of constructing a single sensor entity that detects a traffic accident. The sensor arrangement screen DP1 shows a case where a first sensor group 100 is arranged at a first intersection A1 on a north side and a second sensor group 200 is arranged at a second intersection A2 on a south side. In the case of this example, the first sensor group 100 includes a first camera 101, a second camera 102, and a first microphone 103. The first camera 101 is arranged on the east side of the first intersection A1, and photographs the first intersection A1 from the east side toward the west. The second camera 102 is arranged on the west side of the first intersection A1, and photographs the first intersection A1 from the west side toward the east. The first microphone 103 is arranged to the southeast of the first intersection A1 and records sound generated at the first intersection A1.

In the case of this example, the second sensor group 200 includes a third camera 201 and a second microphone 202. The third camera 201 is arranged on the south side of the second intersection A2, and photographs the second intersection A2 from the south side toward the north. The second microphone 202 is arranged to the southwest of the second intersection A2, and records sound generated at the second intersection A2.

The sensor arrangement screen DP1 may include display of descriptive information 300. The descriptive information 300 is information that describes the single sensor entity, and may be a title of a single sensor entity. In the case of this example, the descriptive information 300 is an "accident detection sensor". A user who uses the sensor construction tool can edit the descriptive information 300 to include arbitrary information for describing the single sensor entity.

A user who uses the sensor construction tool can designate the correspondence of the cameras and microphones arranged in the sensor arrangement screen DP1 to the cameras and microphones actually arranged in the first intersection A1 and the second intersection A2. The sensor construction tool can acquire specific attributes of the arranged sensors based on the designation by the user.

In the case of this example, the composition condition setting screen DP2 includes a first composition condition C1 and a second composition condition C2. Composition conditions for compositing a plurality of sensors included in a sensor group that has been selected from the first sensor group 100 and the second sensor group 200 as a single sensor entity are displayed in the composition condition setting screen DP2. In this example, a case where composition conditions of the first sensor group 100 are displayed in the composition condition setting screen DP2 is described.

The first composition condition C1 prescribes a condition relating to "trigger", that is, a condition such that sensing data is output with the first sensor group 100 used as a single sensor entity. In this example, the first composition condition C1 is "at least X dB", and prescribes that sensing data is output using the single sensor entity when a sound of at least X dB has been detected by the first microphone 103.

The second composition condition is a condition relating to "recording range". The second composition condition prescribes a time range of movie data and audio data to output in a case where the first sensor group 100 satisfies the first composition condition C1 relating to "trigger". In this example, the second composition condition C2 is "one minute before to five minutes after", and prescribes that, in a case where a sound of at least X dB has been detected by the first microphone 103, with respect to a time range of one minute before to five minutes after the sound of at least X dB was detected by the first microphone 103, movie data that has been recorded by the first camera 101 and the second camera 102, and audio data that has been recorded by the first microphone 103, are output as sensing data using a single sensor entity.

The class generation unit 14 generates a sensor container class that includes, as components, one or a plurality of sensor classes each including definitions of attributes of one or a plurality of sensors for which arrangement as one group of sensors was received in the sensor arrangement screen DP1, and a sensor composition class including a composition condition for which setting was received in the composition condition setting screen DP2, with a first interface that includes a declaration of a metadata acquisition method for acquiring metadata being mounted in the sensor container class. Also, the object generation unit 16, based on the sensor container class, generates a sensor container object that includes, as components, one or a plurality of sensor objects each including definitions of specific attributes of one or a plurality of sensors, and a sensor composition object including a specific composition condition for which setting was received by the composition condition setting screen DP2, with a first interface mounted in the sensor container object.

The metadata acquisition unit 17, for example, may extract attributes of a sensor included in a sensor container object as metadata. That is, the metadata, for example, may include a type of information or physical quantity detected by a sensor, a data format of sensing data output by the sensor, a regulation or standard relating to the sensor, a data output format such as REST type or STREAM type, a sensor communications speed, data describing the sensor, or data facilitating a search for the sensor. Also, the metadata may include 4W2H information. 4W2H information is information indicating data regarding sensing of "Who", "What", "When", "Where", or "How", and "How Much" (indicating a price at which the data is provided). The item "Who" may be data relating to a data provider or a data providing organization. The item "What" may be data relating to a data type, an object to be measured or an attribute to be measured. The item "Where" may be data relating to the position or location where a measurement was performed. However, when the sensor that acquires the data moves and the measurement position changes, this data may indicate a range of the measurement position. The item "When" may be data relating to the time when a measurement was performed. When data acquisition is performed periodically and repeatedly, this item may indicate the data acquisition period and the acquisition interval, and when data acquisition is performed singly, this item may indicate the date and time of the data acquisition. The item "How" may be data relating to specifications, measurement conditions, and installation conditions of a device that acquires data. The item "How much" (indicating a price at which the data is provided) may be data relating to an amount of money required for data use and a payment method. Note that, although the 4W2H information is information representing the characteristics of sensing data, sensor metadata may also include such information. That is, the sensor metadata may include information representing the characteristics of the sensing data output by the sensor.

In the case of the example shown in FIG. 7, the metadata acquisition unit 17 may extract the items included in the metadata with reference to the arrangement state of the sensors in the sensor arrangement screen DP1 and the composition conditions that have been set in the composition condition setting screen DP2. For example, the metadata acquisition unit 17 may refer to the descriptive information 300 and extract "accident detection" as the item "What". Also, the metadata acquisition unit 17 may refer to the occurrence time when occurrence of the accident was detected and extract the item "When", or may refer to the installation location of each sensor and extract the item "Where". Also, the metadata acquisition unit 17 may refer to the first composition condition C1 and extract "at least X dB" as the item "How".

The embodiments described above are intended to facilitate understanding of the present invention, and are not to be interpreted as limiting the present invention. The elements included in the embodiment and the arrangement, material, conditions, shape, size, and the like of the elements are not limited to those described in examples, and can be changed as appropriate. Also, configurations disclosed in different embodiments can be partially substituted or combined with each other.

Also, some portion or all of the above embodiments can also be described as stated in the following supplementary notes, but those portions are not limited by the following description.

Supplementary Note 1

A sensor metadata generation device, including:
at least one memory, and at least one hardware processor connected to the memory,
in which the memory stores a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class, and
the hardware processor, based on the sensor container class, generates a sensor container object in which the configuration of the single sensor entity is defined, and
uses the metadata acquisition method by the sensor container object to acquire metadata of the single sensor entity.

Supplementary Note 2

A sensor metadata generation method, including:
with at least one hardware processor, based on a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class, generating a sensor container object in which the configuration of the single sensor entity is defined, and
with the hardware processor, using the metadata acquisition method by the sensor container object to acquire metadata of the single sensor entity.

LIST OF REFERENCE NUMERALS

1 Sensor metadata generation system
10 Metadata generation device
10a CPU
10b RAM
10c ROM
10d Communications interface
10e Input unit
10f Display unit
11 Communications unit
12 Control unit
13 Receiving unit
14 Class generation unit
15 Class storage unit
16 Object generation unit
17 Metadata acquisition unit
18 Sensing data acquisition unit
20 Sensor
100 First sensor group
101 First camera
102 Second camera
103 First microphone
200 Second sensor group 201 Third camera
202 Second microphone
300 Descriptive information
A1 First intersection
A2 Second intersection
B1 First icon
B2 Second icon
C1 First composition condition
C2 Second composition condition
DB Sensing data storage unit
DP Sensor construction screen
DP1 Sensor arrangement screen
DP2 Composition condition setting screen
N Communications network
PT Pointer

The invention claimed is:

1. A sensor metadata generation device comprising:
at least one memory, and at least one hardware processor connected to the memory, wherein
the memory stores a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class, and
the hardware processor, based on the sensor container class, generates a sensor container object in which the configuration of the single sensor entity is defined,
uses the metadata acquisition method by the sensor container object to acquire metadata of the single sensor entity, and
extracts the items in the metadata based on the arrangement state of the one or more sensors and the composition conditions.

2. The sensor metadata generation device according to claim 1,
wherein
the memory stores the sensor class in which the first interface is mounted, and
the hardware processor, based on the sensor class, generates a sensor object in which the configuration of a sensor is defined, and uses the metadata acquisition method by the sensor object to acquire metadata of the sensor.

3. The sensor metadata generation device according to claim 2,
wherein in the sensor container class, a second interface that includes a declaration of a sensing data acquisition method for acquiring sensing data to be output from the single sensor entity is mounted, and
the hardware processor uses the sensing data acquisition method by the sensor container object to acquire the sensing data.

4. The sensor metadata generation device according to claim 2, wherein:
the hardware processor receives selection of one or a plurality of sensors and a composition condition for compositing the one or a plurality of sensors as a single sensor entity, and
generates a sensor container class that includes, as components, one or a plurality of sensor classes each including definitions of attributes of one or a plurality of sensors for which selection was received by the receiving unit, and a sensor composition class including a composition condition received by the receiving unit, with a first interface being mounted in the sensor container class; and
the memory stores the sensor container class.

5. The sensor metadata generation device according to claim 1,
wherein
in the sensor container class, a second interface that includes a declaration of a sensing data acquisition method for acquiring sensing data to be output from the single sensor entity is mounted, and
the hardware processor uses the sensing data acquisition method by the sensor container object to acquire the sensing data.

6. The sensor metadata generation device according to claim 5, wherein:
the hardware processor receives selection of one or a plurality of sensors and a composition condition for compositing the one or a plurality of sensors as a single sensor entity, and generates a sensor container class that includes, as components, one or a plurality of sensor classes each including definitions of attributes of one or a plurality of sensors for which selection was received by the receiving unit, and a sensor composition class including a composition condition received by the receiving unit, with a first interface being mounted in the sensor container class; and
the memory stores the sensor container class.

7. The sensor metadata generation device according to claim 1, wherein:
the hardware processor receives selection of one or a plurality of sensors and a composition condition for compositing the one or a plurality of sensors as a single sensor entity, and generates a sensor container class that includes, as components, one or a plurality of sensor classes each including definitions of attributes of one or a plurality of sensors for which selection was received by the receiving unit, and a sensor composition class including a composition condition received by the receiving unit, with a first interface being mounted in the sensor container class; and
the memory stores the sensor container class.

8. A sensor metadata generation system comprising:
the sensor metadata generation device according to claim 1; and
one or a plurality of sensors configured to be connected to the sensor metadata generation device through a communications network;
wherein the sensor metadata generation device generates metadata of the one or a plurality of sensors.

9. A sensor metadata generation method comprising:
generating, based on a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class, a sensor container object in which the configuration of the single sensor entity is defined;
using the metadata acquisition method by the sensor container object to acquire metadata of the single sensor entity, and extracting the items in the metadata based on the arrangement state of the one or more sensors and the composition conditions.

10. A non-transitory computer-readable medium storing a sensor metadata generation program which, when read and executed, causes a computer to execute operations comprising:
   storing a sensor container class that includes, as components, one or a plurality of sensor classes each including definitions of attributes of one or a plurality of sensors, and a sensor composition class including a composition condition for compositing the one or a plurality of sensors as a single sensor entity, with a first interface that includes a declaration of a metadata acquisition method for acquiring metadata being mounted in the sensor container class;
   generating, based on the sensor container class, a sensor container object in which the configuration of the single sensor entity;
   using the metadata acquisition method by the sensor container object to acquire metadata of the single sensor entity; and
   extracting the items in the metadata based on the arrangement state of the one or more sensors and the composition conditions.

11. A sensor metadata generation system comprising:
   the sensor metadata generation device according to claim 2; and
   one or a plurality of sensors configured to be connected to the sensor metadata generation device through a communications network;
   wherein the sensor metadata generation device generates metadata of the one or a plurality of sensors.

12. A sensor metadata generation system comprising:
   the sensor metadata generation device according to claim 5; and
   one or a plurality of sensors configured to be connected to the sensor metadata generation device through a communications network;
   wherein the sensor metadata generation device generates metadata of the one or a plurality of sensors.

13. A sensor metadata generation system comprising:
   the sensor metadata generation device according to claim 7; and
   one or a plurality of sensors configured to be connected to the sensor metadata generation device through a communications network;
   wherein the sensor metadata generation device generates metadata of the one or a plurality of sensors.

* * * * *